US012750672B1

(12) United States Patent
Quadros et al.

(10) Patent No.: US 12,750,672 B1
(45) Date of Patent: Sep. 29, 2026

(54) FRAUD PREVENTION WITH INBOUND TELEPHONY-BASED VERIFICATION

(71) Applicant: Amazon Technologies, Inc., Seattle, WA (US)

(72) Inventors: Bradley Vivian Quadros, Seattle, WA (US); Paul Grassi, Richmond, VA (US); Paras Avkirkar, Seattle, WA (US); Harnil C Rafalia, Bothell, WA (US); Aranya Purushothaman, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 18/622,004

(22) Filed: Mar. 29, 2024

(51) Int. Cl.
*H04W 12/12* (2021.01)
*H04W 4/14* (2009.01)
*H04W 12/06* (2021.01)

(52) U.S. Cl.
CPC ............. *H04W 12/12* (2013.01); *H04W 4/14* (2013.01); *H04W 12/06* (2013.01)

(58) Field of Classification Search
CPC ....... H04W 12/12; H04W 4/14; H04W 12/06; H04W 4/12
See application file for complete search history.

(56) References Cited

U.S. PATENT DOCUMENTS

| | | | | |
|---|---|---|---|---|
| 9,294,923 | B2 | 3/2016 | Meacham et al. | |
| 12,554,878 | B2 * | 2/2026 | Agarwal | G06F 21/6245 |
| 2016/0140844 | A1 * | 5/2016 | Njihia | G08G 1/127 340/989 |
| 2025/0219839 | A1 * | 7/2025 | Pearse | H04L 9/3228 |

OTHER PUBLICATIONS

Kount, "Fraud detection software built to prevent revenue loss," kount.com, https://kount.com/fraud-detection-software?utm_source=ps-google&utm_campaign=fraud-detection-software&utm_content=fraud-detection-software&kw=fraud%20detection&cpn=19799578551&cg_src=google_ads&cg_cmp=19799578551&cg_term=fraud%20detection&cg_med=&cg_piao=cg_net=g&cg_pff=gp&_bt=675232449781&_bk=fraud%20detection&_bm=p&_bn=g&_bg=156882504711&gad_source=1&gclid=EAlalQobChMlitOyo_lKhQMVuYpCCB266QYWEAAYAIAAEglAvPD_BwE, retrieved on Mar. 25, 2024 in 46 pages.

Shield, "Stop Fraud, Build Trust, & Drive Growth with Device-First Faud Prevention," shield.com, https://shield.com/landing/fraud-prevention?utm_source=google&utm_medium=cpc&utm_campaign=Search_USA_P2_EN_Oct2021&utm_content=Fraud%20Prevention&utm_ad=602095194216&utm_term=fraud%20prevention&matchtype=p&device=c&GeoLoc=9061189&placement=&network=g&campaign_id=17421963581&adset_id=138314283118&ad_id=602095194216&gad_source=1&golid=EAIaIQobChMI_t-Bs_IKhQMVb0N_AB2XegT6EAAYALAAEgLutPD_BwE, retrived on Mar. 25, 2024 in 3 pages.

* cited by examiner

*Primary Examiner* — John J Lee
(74) *Attorney, Agent, or Firm* — Knobbe, Martens, Olson & Bear, LLP

(57) ABSTRACT

Fraud verification with inbound telephony-based verification is provided. A user through a computing device may request an action from a service. A verification system may receive this request and ascertain the risk level for the request is above a threshold triggering inbound telephony-based verification. The risk assessment may be based on characteristics of the request, such as a phone number corresponding to the request or a network address corresponding to the requesting computing device. To conduct the inbound telephony-based verification, the verification system may send the computing device instructions to send a verification message through the phone network to a specified destination. On receipt of the message at the destination, the verification system may verify that the request is not (Continued)

fraudulent and cause the performance of the requested action.

20 Claims, 9 Drawing Sheets

FRAUD PREVENTION WITH INBOUND TELEPHONY-BASED VERIFICATION

BACKGROUND

Mobile devices may be capable of accessing a variety of network types, such as a local area network ("LAN"), public switched telephone network ("PSTN"), or the Internet. These devices may be referred to as smart devices. Smart devices may be capable of accessing software applications, such as browsers, to receive data through the networks. A smart device may, for example, send a short message service ("SMS") message through the PSTN to another smart device.

Smart devices may also include a variety of sensors linked to software applications. For example, smart devices may include cameras linked to camera-control software applications, which may be enabled to read QR codes and enable users to select the QR code to access websites through a browser application.

DETAILED DESCRIPTION

Introduction

Figure 1:
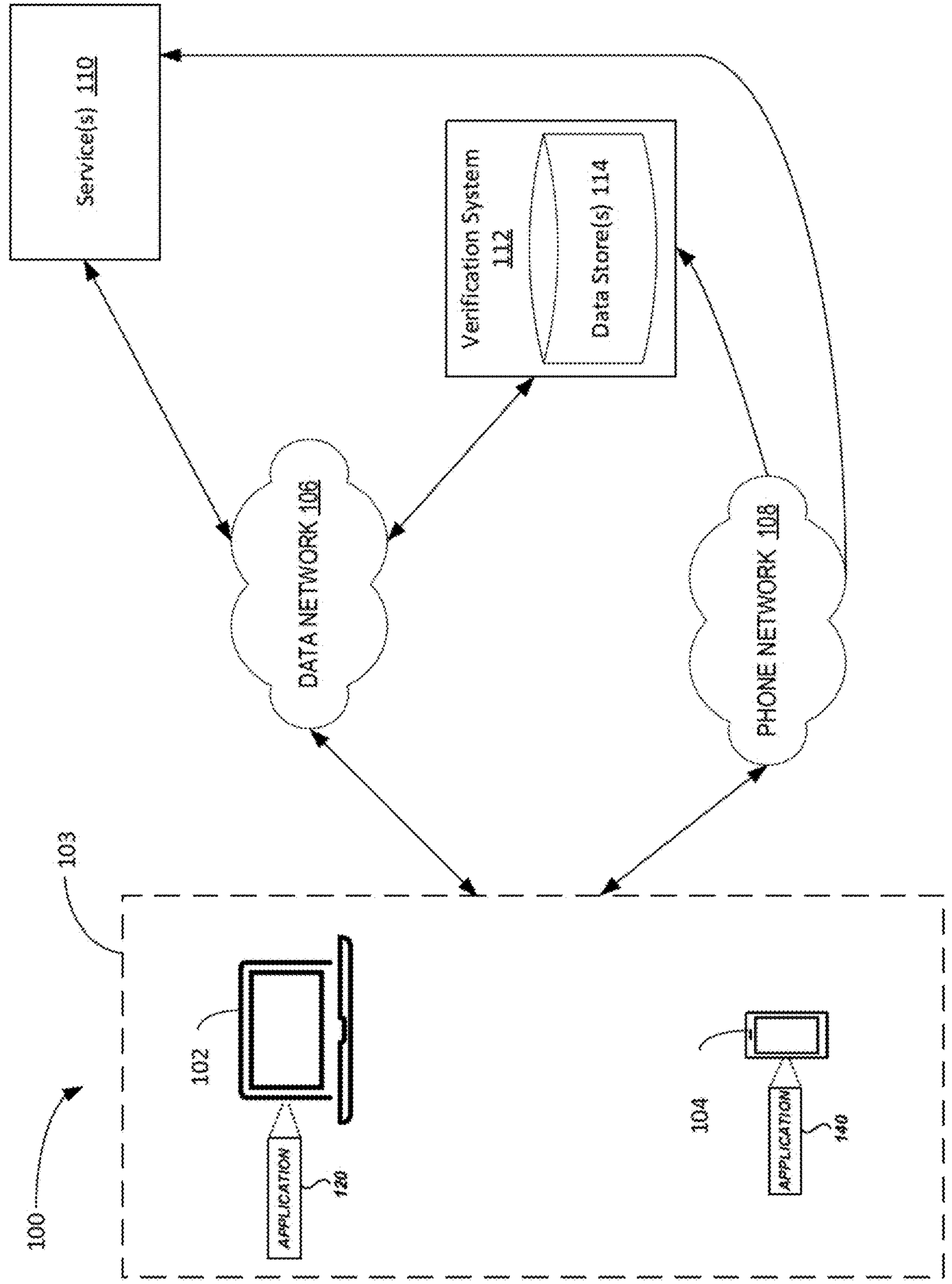
FIG. 1 illustrates an example system for inbound telephony-based verification, in accordance with some aspects of the disclosure.

Generally described, aspects of the present disclosure relate to fraud prevention. More specifically aspects of the present disclosure relate to inbound telephony-based verification through a phone network, such as verification of a request with an inbound short message service ("SMS") or multimedia message service ("MMS") message to a specified short code or other phone number associated with a verification service.

Telephony-based pumping attacks, such as SMS pumping attacks, occur when bad actors exploit a workflow to inflate the traffic volume of a phone network. This increases latency of the phone network and may prevent genuine users from accessing their accounts. Verification workflows, such as verifying whether a request is fraudulent, are common targets of telephony-based pumping attacks.

Conventional verification workflows may initiate verification when a user requests an action from a service, such as, login, account creation, two-factor authentication, one-time passcode (OTP), updating user profile information (e.g., phone number, email, password, payment information, etc.), placing an order, the like, or some combination thereof. Some verification workflows rely on one or more factors users to prove a user's identity, such as a knowledge factor (e.g. a password, PIN, or answer to a secret question), an inherence factor (e.g., a fingerprint, faceprint, or voice signature), and/or a possession factor (e.g., possession of a phone to which a unique phone number is assigned). For example, when a possession factor is required, an outbound telephony-based message (e.g., an SMS message) is sent to a phone number uniquely associated with a user. The outbound telephone-based message typically includes a code (e.g., an OTP) that user must provide, or a link that a user must click, to confirm that the user is in possession of the phone to which the phone number is uniquely assigned. Using a phone network to send messages to users' phones imposes network costs, such as computing resources, time in sending the messages, the like, or some combination thereof. Because conventional phone networks apply a network cost to the initiator of the telephony-based message, transmitting the initial telephony-based message imposes network costs on the service initiating the verification flow.

Conventional verification workflows may further block users from receiving the result of a requested action. By way of illustration, a user's request to a software platform (e.g., a code execution platform or an e-commerce platform) may be to perform an action (e.g., execute a function or access their account). However, if the user is incorrectly flagged by a verification workflow as a fraudulent user, the user may be blocked from performing the requested action for an extended period of time. Users may be blocked based on a risk level associated with their request, where the risk level is determined based on characteristics of the request. Characteristics of the request may include the requested action, a phone number, location, network address, or behavior of the user (e.g., number of repeated visits from a user) associated with the request. Blocking genuine users from performing actions increases customer dissatisfaction with the service implementing the conventional verification workflow.

Aspects of the present disclosure correct the deficiencies of conventional approaches at least by requiring a user to send an inbound telephony-based message to verify their identity. This advantageously decreases the value of telephony-based pumping attacks by requiring the bad actors to initiate communication through the phone network. Requiring bad actors to initiate communication through the phone network imposes network costs on the bad actors.

Aspects of the present disclosure further reduce the latency for genuine users in receiving the result of a requested action if they are incorrectly flagged as fraudulent. By way of illustration, in some aspects, a user may request an action from a specified service through a computing device. The specified service may call a verification system to determine whether inbound telephony-based verification is needed prior to performing the requested action. If so, the verification system may provide instructions to the computing device through a data network. The instructions may include a request to send a message through a phone network (also referred to herein as a "telephony-based message") to a specified destination accessible through a phone network, such as an SMS short code. Based on the instructions, the user may send the message to the specified destination. On receipt of the message, the verification system may complete verification, and the specified service may perform the requested action.

In some aspects, the verification system might provide a barcode (e.g., a QR code, a data matrix code, the like, etc.)

with an embedded deep link. On selection by a user, the deep link may be configured to open a messaging application and generate a draft telephony-based message addressed to the destination. On receipt of a message at the destination, the verification service may verify the user's identity or otherwise cause the performance of the requested action by the specified service.

Various aspects of the disclosure will now be described with regard to certain examples and embodiments, which are intended to illustrate but not limit the disclosure. Additionally, any feature used in any embodiment described herein may be used in any combination with any other feature or in any other embodiment, without limitation.

Example Computing Environment

FIG. 1 illustrates an example system 100 for inbound telephony-based verification, in accordance with some aspects of the disclosure. System 100 may include computing device(s) 103, data network 106, phone network 108, service(s) 110, and verification system 112. The computing device(s) 103 may communicate through data network 106 and/or phone network 108 with service(s) 110. Service(s) 110 may call verification system 112 prior to performing the requested actions. Verification system 112 may determine a risk level for a request initiated by computing device(s) 103. The determination may be based on data in data store(s) 114. Based on the risk level, the verification system 112 may conduct inbound telephony-based verification through phone network 108, as will be discussed in more detail below.

Phone network 108 may be a circuit-switched network or other telephone network. For example, phone network 108 may be a publicly-accessible telephone network, such as a the PSTN. In some cases, phone network 108 may be a private telephone network or may include a private telephone network, such as a private branch exchange ("PBX"). Phone network 108 may be referred to as a "phone network" to highlight its use as a network for transmitting telephone communications such as telephone call audio, text messages, and the like.

In some examples, data network 106 may be a packet-switched data network. Illustratively, data network 106 may be a publicly-accessible network of linked networks, possibly operated by various distinct parties, such as the Internet. In some cases, the data network 106 may include a private network, personal area network, local area network, wide area network, cable network, satellite network, cellular data network, etc., or a combination thereof, some or all of which may or may not have access to and/or from the Internet. Data network 106 may be used to transmit bit-encoded data and referred to as a "data network" to highlight its use for this purpose.

In general, computing device(s) 103 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. Some computing device(s) of computing device(s) 103 may be able to communicate through data network 106. By way of illustration, computing device 104 may be a smartphone, which can send a message through data network 106 to computing device 102. Computing device 102 may be a laptop configured to receive messages from the data network 106 with application 120. Illustratively, a user through application 140 (e.g., a browser, a mail application, etc.) of computing device 104 may receive user input comprising a message and send that message to computing device 102. Another user through application 120 (e.g., a browser, a mail application, etc.) of computing device 102 may access the message. In further examples, the other user may respond to the message with application 120, and the response may be provided to computing device 104 through data network 106. Computing device 104 may receive the message with application 140.

Some computing device(s) 103 may also be able to communicate through phone network 108. In some examples, both computing devices 102 and computing devices 104 may be smart devices able to connect with both phone network 108 and data network 106. They may use a messaging application to send telephony-based messages (e.g., SMS messages, MMS messages, etc.) with the phone network 108. Illustratively, application 120 may be an SMS application (or SMS-enabled multi-protocol application) and application 140 may also be an SMS application (or SMS-enabled multi-protocol application). Computing device 102 and computing device 104 may communicate via the phone network 108 with applications 120 and 140. They may also communicate with other systems through phone network 108, such as service(s) 110 or verification system 112.

Service(s) 110 may include any network-accessible service. For example, service(s) 110 may include, but are not limited to, an e-mail service, a search platform, a shopping platform, a code execution platform, a news source, a social media platform, the like, or some combination thereof. Users may access service(s) 110 through a computing device in communication with data network 106 or phone network 108 (e.g., computing device(s) 103). During communication with the user, service(s) 110 may provide the computing device(s) 103 with one or more user interfaces.

Service(s) 110 may implement verification workflows before performing requested actions for users, such as allowing access to a user account (e.g., approving a login request), providing two-factor authentication, providing an OTP, updating user profile information (e.g., phone number, email, password, payment information, etc.), placing an order, the like, or some combination thereof. In some examples, the service(s) 110 may set triggers to initiate implementation of the verification workflows. The triggers may include the type of requested action. Illustratively, the verification workflows may be triggered if the requested action includes at least one of allowing access to a user account (e.g., approving a login request), providing two-factor authentication, providing an OTP, updating user profile information (e.g., phone number, email, password, payment information, etc.), placing an order, or the like. The triggers may additionally, or alternatively, include, a risk level corresponding to one or more characteristics of the request. As discussed, characteristics of the request may include the requested action, a phone number, location, network address, or behavior of the user (e.g., number of repeated visits from the user). In some examples, service(s) 110 may use verification system 112 to implement these verification workflows. In further examples, verification system 112 may determine whether a trigger for initiating implementation of the verification workflows has occurred.

Verification system 112 may perform inbound telephony-based verification for requests directed to service(s) 110, as will be discussed in more detail below. Verification system 112 may receive requests for verification directly from the computing device(s) 103 through the data network 106. Alternatively, the service(s) 110 may forward requests from computing device(s) 103 to verification system 112 for verification through the data network 106. To perform verification, the verification system 112 may ascertain a risk level for a request and determine whether to conduct inbound telephony-based verification based on that risk level. If verification system 112 determines to conduct inbound telephony-based verification, the verification system 112 may provide the user with instructions to send a message to a specified telephone number, such as an SMS short code. The instructions may be provided through one or more user interfaces, as will be discussed in FIGS. 2A-2D below. The verification system 112 may access data store(s) 114 to implement the aforementioned functions.

Data store(s) 114 may be a data storage system configured to hold data associated with the risk level for computing device(s) 103. For example, the data store(s) 114 may include a list of phone numbers and corresponding risk levels, a list of network addresses and corresponding risk levels, formulas or algorithms used to assess risk based on a number of characteristics of a request, the like, or some combination thereof. Characteristics of a request may include, but are not limited to, a network address for the computing device that provided the request, a phone number included with the request, a phone number corresponding to an account for the user with the service, the like, or some combination thereof.

As one example of using data store(s) 114 during verification, the verification system 112 may be configured to access an algorithm for risk assessment from data store(s) 114. The verification system 112 may then use risk level data, such as risk levels associated with network addresses and phone numbers, stored in data store(s) 114 to determine an overall risk level for a request. The verification system 112 may then determine whether to conduct verification based on that determined risk level. On verification of the request, a user may be allowed to access the requested service. The process for verification will be discussed in more detail in FIGS. 2A-5.

As another illustrative example, a user may request to access an account for a specific service of service(s) 110 through computing device 102. The specific service may use verification system 112 to determine whether their request is fraudulent. After receiving the request, verification system 112 may determine that the request requires inbound telephony-based verification. The determination that inbound telephony-based verification is required may be based on a risk level associated with the request.

Verification system 112 may ascertain a risk level for the request based on characteristics of the request. As discussed above, characteristics of a request may include, but are not limited to, a network address for the computing device 102, a phone number included with the request, a phone number corresponding to an account for the user with the specific service, a location corresponding to the request, behavior of the user corresponding to the request (e.g., number of repeated visits by the user), the like, or some combination thereof. The verification system 112 may further base its determination of risk level on risk data in data store(s) 114. Illustratively, data store(s) 114 may include a list of telephone country codes and a risk level for each area code. The request may include a phone number including one of the country codes on the list. Accordingly, the verification system 112 may ascertain a risk level for the request based on the risk level for the country code.

To perform the inbound telephony-based verification, the verification system 112 may communicate with computing device 102 through data network 106. In some examples, the verification system 112 may communicate with computing device 102 using one or more user interfaces, as will be discussed in more detail below. The computing device 102 may send verification through phone network 108, and the verification system 112 may then verify the computing device 102. The service(s) 110 may then perform the requested action. The service(s) 110 may provide the result of the requested action to the computing device 102 through the data network 106 or through phone network 106. While the above example describes using computing device 102 alone to communicate with verification system 112, this is not intended to be limiting. In some examples, another computing device (e.g., computing device 104) may be used in addition to computing device 102. By way of illustration, a user through computing device 102 may submit the request for an action and receive instructions from verification system 112 to provide inbound telephony-based verification by sending a message through the phone network 108 to a specified destination. The user may utilize computing device 104 to carry out the instructions to send a message through the phone network 108 to the specified destination.

After verification, the verification system 112 may cause the performance of the requested action. Illustratively, the verification system 112 may provide a notification to the specific service of service(s) 110 that will perform the requested action, and the specific service may then perform the requested action.

While verification system 112 is shown as separate from service(s) 110, this is not intended to be limiting. Verification system 112 may be included in a service of service(s) 110. As another example, the service(s) 110 might be part of a network service provider and the verification system 112 might also be part of that network service provider. For example, the network service provider might include a plurality of servers configured to host various services (e.g., service(s) 110), and the verification system 112 may be implemented with those servers.

Examples of Inbound Telephony-Based Verification for Account Creation Request

FIGS. 2A-2D illustrate example user interfaces in accordance with some aspects of the disclosure. A user through a computing device (e.g., computing device(s) 103 of FIG. 1) may request that an action be performed by a specific service (e.g., a service of service(s) 110 of FIG. 1). The action may include, but is not limited to, creating an account, providing a one-time passcode, providing two factor authentication, or the like. Such actions may trigger inbound telephony-based verification, as described herein.

Figure 2A:
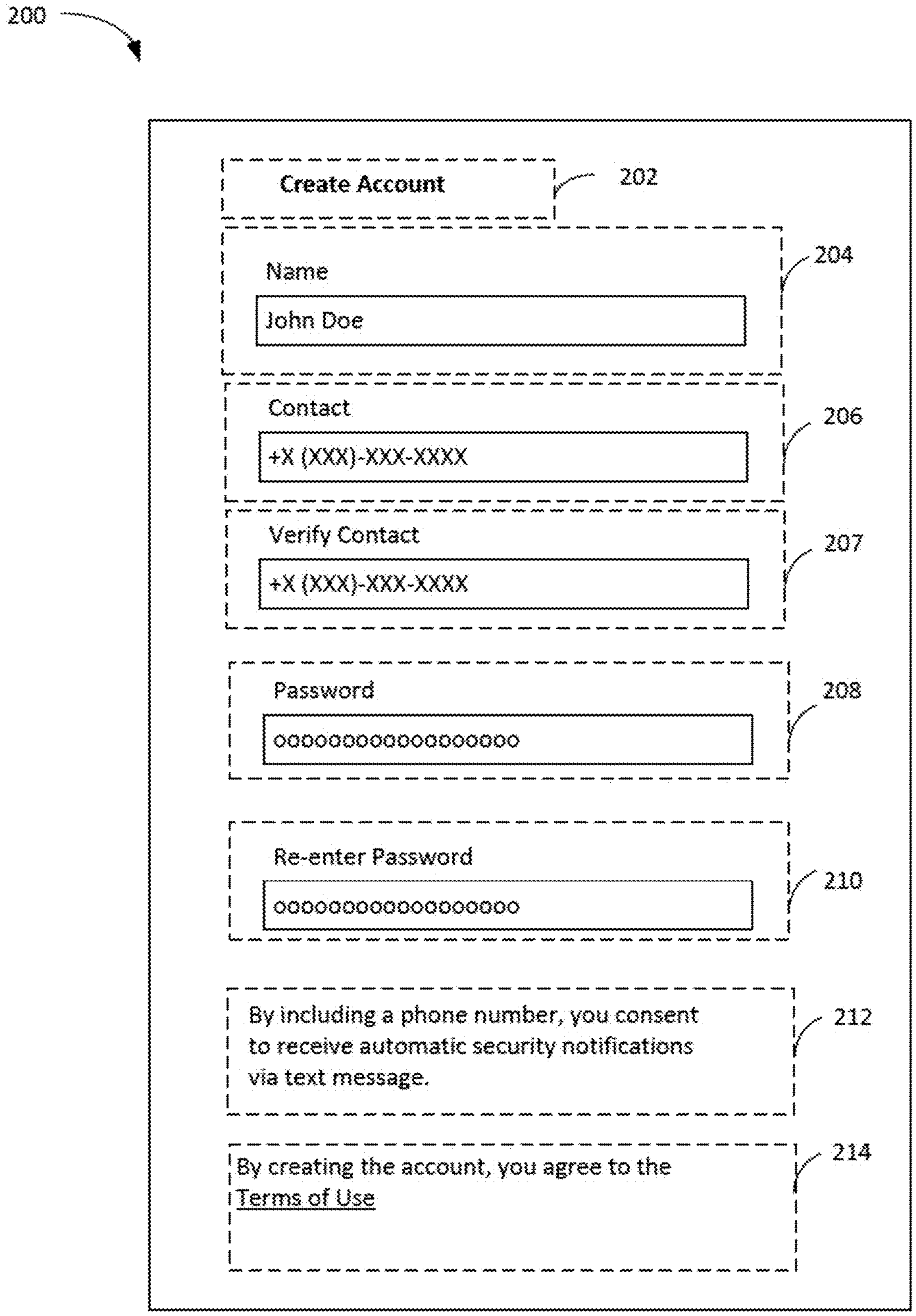
FIGS. 2A, 2B, 2C, and 2D illustrate example user interfaces in accordance with some aspects of the disclosure.

FIG. 2A illustrates an example user interface 200 for a request to create an account with a specific service (e.g., service(s) 110 of FIG. 1). The verification system 112 may access this request and make a determination to perform inbound telephony-based verification, as will be discussed in more detail below.

User interface 200 may be generated by the service 110. As another example, the service 110 may call an application programming interface (API) to generate the user interface 200. The example user interface 200 may include multiple fields for instructing the user to provide input, some of which can receive user input values. The service 110 may use the provided input to perform the requested action of creating an account.

The user interface 200 may include a title 202 of "Create Account," which may serve to indicate that the requested action is to create an account. Name field 204 receives the name of the user. In the illustration of FIG. 2A, the user's name is "John Doe." Contact field 206 receives a method to contact the user, such as a phone number or an e-mail. The user input (e.g., phone number) entered in contact verification field 207 may serve to confirm the user input (e.g., phone number) entered in contact field 206. In the illustration of FIG. 2A, the contact field 206 receives user input of a phone number "+X (XXX)-XXX-XXXX." Contact verification field 207 may receive the same phone number "+X (XXX)-XX KX-XXXX." However, in some examples, the user input entered in contact field 206 may differ from the user input entered in contact verification field 207. If the user input entered in contact field 206 differs from the user input entered in contact verification field 207, then the user interface 200 may be configured to display an alarm to the user conveying that the user input of contact field 206 and of contact verification field 207 do not match. The user may then resolve the issue prior to submitting the request to create an account. For example, the user may update the user input of contact field 206 and/or the user input of contact verification field 207 to match each other.

Password field 208 and password verification field 210 receive user input including a password that the user intends to use to access the requested account. The user input entered in password verification field 210 may serve to confirm the user input entered in password field 208. In the illustrative example of FIG. 2A, the password field 208 and password verification field 210 receive the same password of "000000000000000000." However, in some examples, the password entered into password field 208 and password verification field 210 may not match. If the password entered into password field 208 and password verification field 210 do not match, then the user interface 200 may be configured to display an alarm to the user conveying that the user input of password field 208 and the user input of password verification field 210 do not match. The user may then update the user input to resolve the issue prior to submitting the request to create an account. For example, the user may update the user input of password field 208 and/or the user input of password verification field 210 to match each other.

Disclaimer field 212 may include the language "by including a phone number, you consent to receive automatic security notifications via text message." This language may serve as an indicator of user consent to receive communications on the security of the account creation or on the performance of their requested action, as will be discussed in more detail in FIGS. 2B-5. The language included in disclaimer field 212 may differ if the contact provided is an e-mail instead of a phone. For example, if an email is provided in contact field 206, then the language of disclaimer field 212 may be "by including an email, you consent to receive automatic security notifications via email."

Disclaimer field 214 may include the language "[b]y creating the account, you agree to the Terms of Use." This may serve as an indicator of user consent to the terms of use or of user review of the terms of use.

Figure 2B:
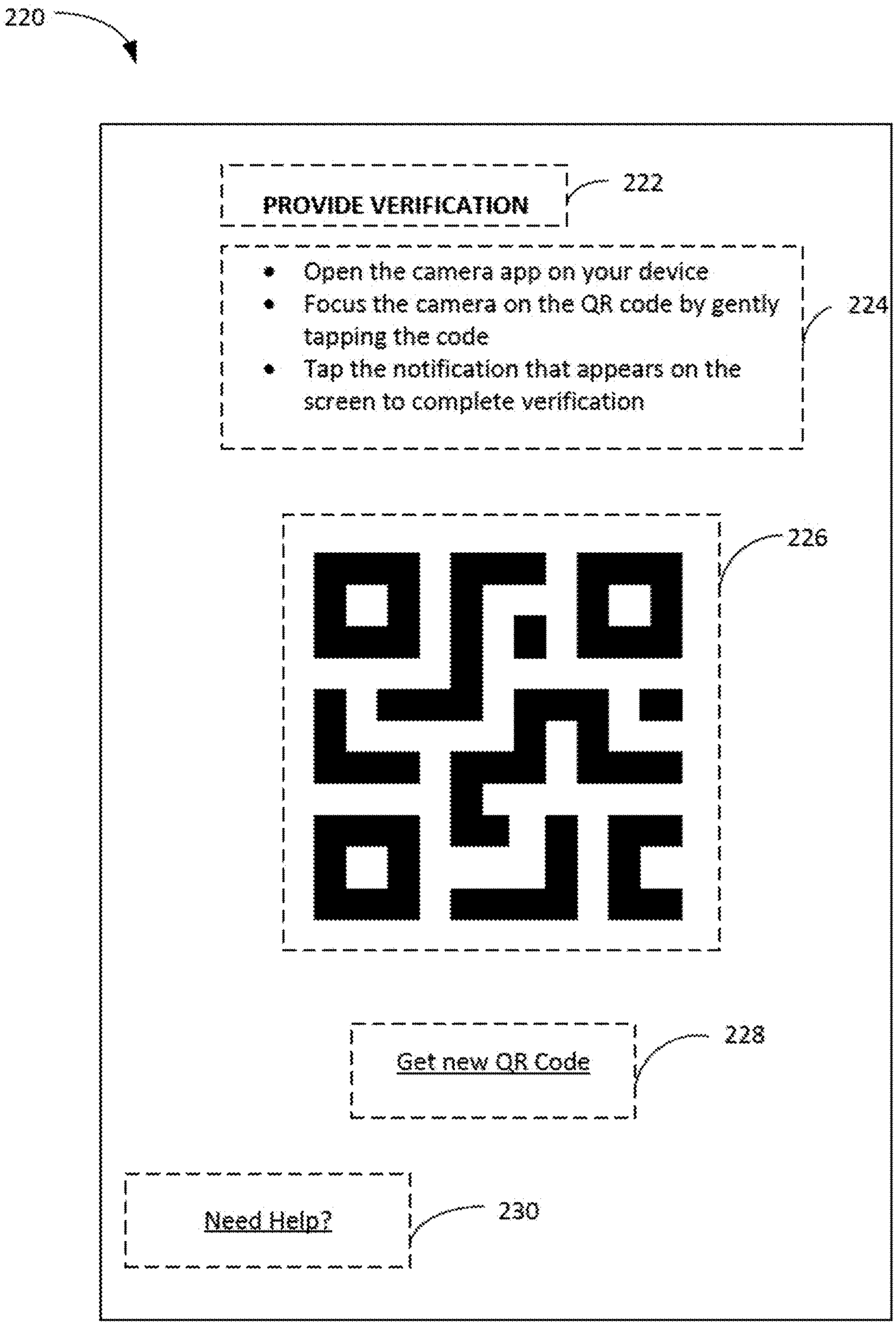

FIG. 2B illustrates a user interface 220 for providing instructions for inbound telephony-based verification. After determining that inbound telephony-based verification is required, the verification system 112 may present a user interface providing instructions to the user on how to perform the verification. The instructions may include a specified destination to which the user should send a message through the phone network (e.g., phone network 108 of FIG. 1). The instructions may further include a unique identifier for the request (e.g., a verification code). Illustratively, the user interface may include a deep link configured to open a messaging app and generate a draft message addressed to the specified destination and including the unique identifier. In some examples, the deep link may be embedded in a barcode (e.g., a QR code, a data matrix code, etc.).

One example of a user interface providing instructions for inbound telephony-based verification is user interface 220 of FIG. 2B. The user interface 220 may appear after a user submits a request for an action, such as when a user submits a request to create an account with user interface 200. After submission of the request, the user interface 220 might appear to provide instructions on how the user can complete inbound telephony-based verification and receive the result of the requested action, such as creation of an account, two-factor authentication, an OTP, updating user profile information (e.g., phone number, email, password, payment information, etc.), placing an order, the like, or some combination thereof.

The user interface 220 includes title field 222. Title field 222 includes the language "provide verification." This language may serve to indicate to the user that the intent of the user interface 220 is to facilitate inbound telephony-based verification. The user interface 220 may further include instructions 224, which provide that the user should "[o]pen the camera app . . . ," "[f]ocus the camera on the QR code by gently tapping the code", and "[t]ap the notification that appears on the screen to complete verification."

The QR code 226 may include a deep link. A deep link (e.g., a URL (Uniform Resource Locator), hyperlink, etc.) may point to a specific piece of content within a mobile application or website. On selection of the deep link, a user may be taken directly to the specific piece of content. When a user follows instructions 224 of FIG. 2B and "[t]ap[s] the notification that appears on the screen," the deep link embedded in QR code 226 may be selected. Selecting the deep link may open a messaging app on the user's device, with a message prefilled to arrive at a specified destination, as will be discussed in more detail in FIG. 2C.

In some examples, the QR code 226 may not work as intended. Illustratively, the user may receive the notification that the verification has not been completed, as will be discussed in more detail in FIG. 2D. The user may additionally, or alternatively, select other options to complete the verification. Illustratively, the user may select link 228 or link 230 of FIG. 2B.

Link 228 may direct the user to a new user interface including a different QR code and a different deep link. This new QR code may allow the user to complete the verification. The user may also select link 230, which may open a link to send an e-mail or otherwise contact a help service of the verification system 112. The link 230 may additionally, or alternatively, contact a help service of the particular service of the services 110 from which the user is requesting an action.

Figure 2C:
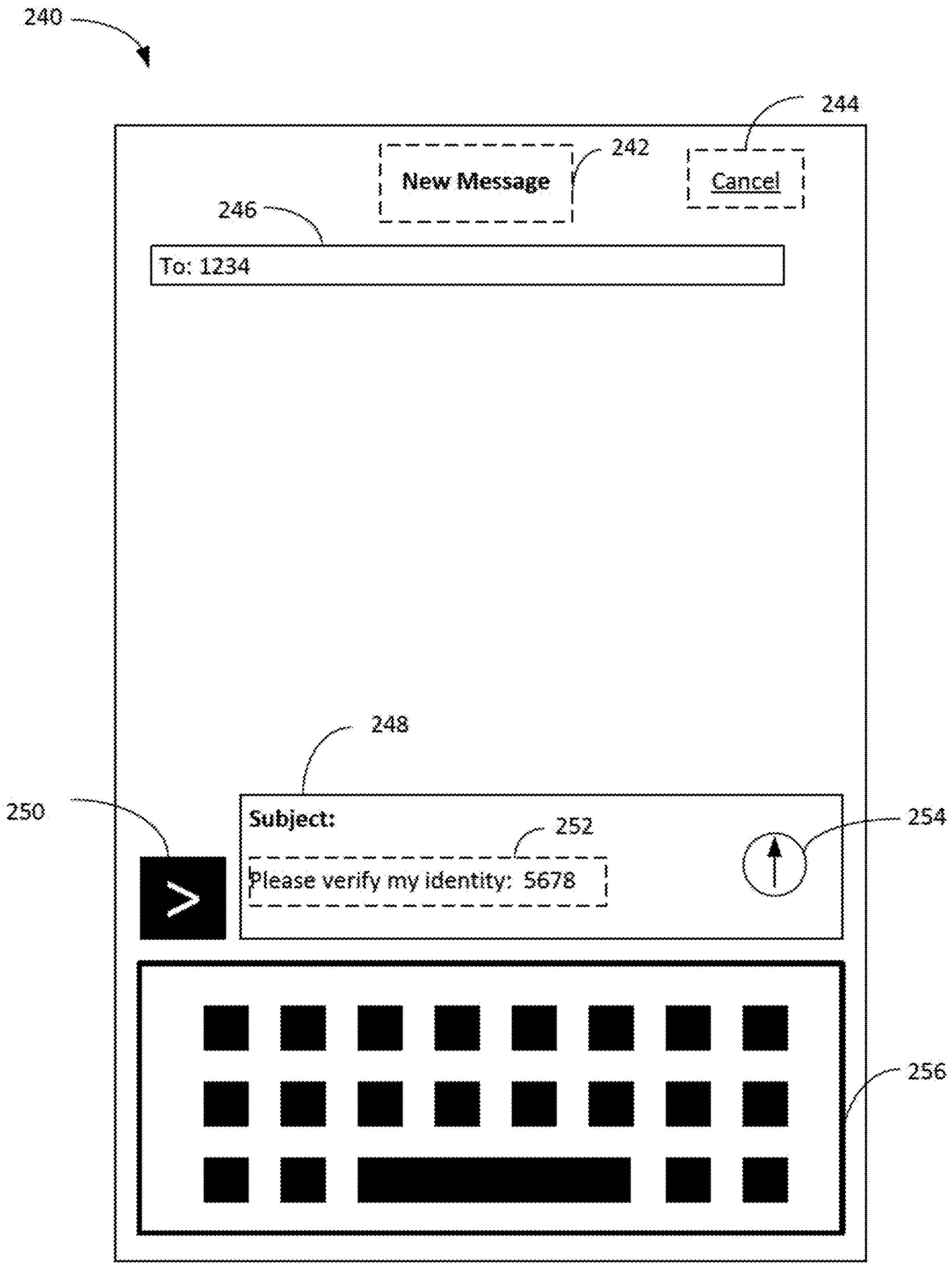

FIG. 2C illustrates an example user interface 240 for sending a message through a phone network (e.g., phone network 108 of FIG. 1) to a specified destination. As discussed with respect to FIG. 2B, the verification system 112 may generate a user interface (e.g., user interface 220 of FIG. 2B) that includes a deep link. Selection of the deep link may open a messaging app for communication through a phone network (e.g., phone network 108 of FIG. 1). Selection of the deep link may further generate a draft telephony-based message addressed to a specified destination via a phone network (e.g., an SMS short code). In some embodiments, the deep link may cause the draft message to be pre-populated with a unique identifier corresponding to the request (e.g., a verification code).

User interface 240 may be an example of a draft message generated by selection of the deep link provided by verification system 112. Illustratively, the user interface 240 may appear on selection of the deep link included in QR code 226 of FIG. 2B. The user interface 240 may include a title 242 including the language "New Message." The language may serve to indicate that the intent of the user interface 240 is to send a message. Cancel link 244 may allow the user to exit the user interface 240. Alternatively, cancel link 244 may allow the user to exit a messaging application corresponding to the user interface 240. If the cancel link 244 is selected, then the message 252 may not be sent.

Address box 246 may direct the message to a specified destination. As illustrated in FIG. 2B, the address box 246 includes the language "To: 1234." This may indicate that the specified destination is "1234." In some examples, "1234" may represent an SMS short code accessible to the verification system 112. As discussed above once a message is received at the specified destination, the verification system 112 may complete the verification for the request corresponding to that message.

The message 252 may be preceded by subject 248. While subject 248 is blank, this is not intended to be limiting. In some examples, subject 248 may include language indicating that the message 252 is intended for verification purposes, such as the language "verification message."

The message 252 may include the language "please verify my identity: 5678." "5678" may represent a unique identifier for the request, the user, or the computing device which sent the request. Illustratively, "5678" may be a verification code unique to the request being verified. The message 252 may be sent through buttons 250 or 254. The keyboard 256 may be used to modify the message 252 prior to sending the message 252. The message 252 may be sent by selecting button 250 or button 254.

Figure 2D:
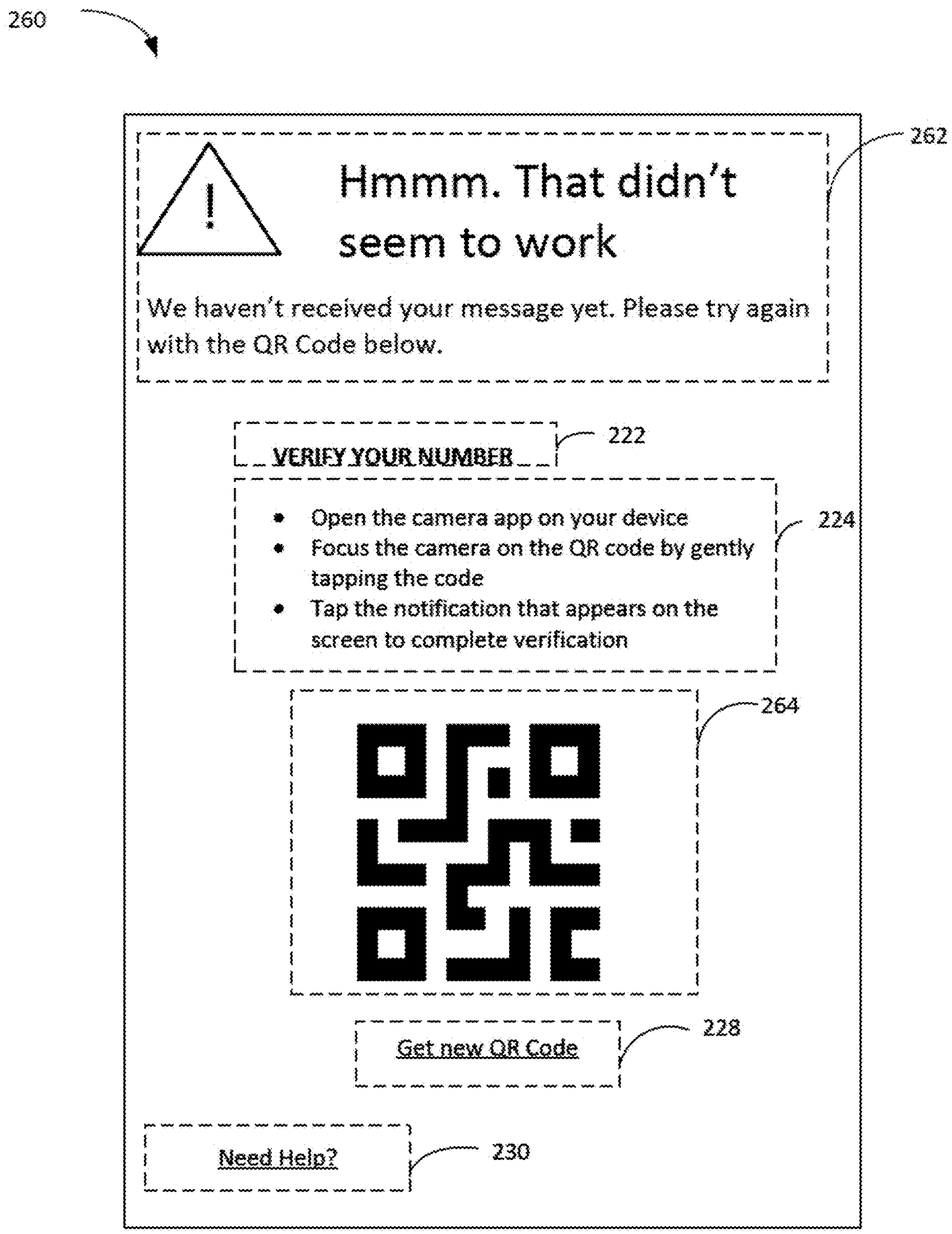

FIG. 2D illustrates an example user interface 260 for verification. The user interface 260 may be generated by verification system 112, as will be described in more detail below. As another example, the verification system 112 might call a service (e.g., an API) to generate the user interface 260.

The user interface 260 may include a failure indicator 262, a title field 222, instructions 224, a replacement QR code 264, and links 228 and 230. The user interface 260 may appear if the user does not send a message in accordance with the deep link included in the QR code 226 of FIG. 2B. The failure indicator 262 may indicate that the verification was not successful. The failure indicator 262 may also include a reason why the verification was not successful. As illustrated in FIG. 2C, the failure indicator 262 includes the language: "We haven't received your message yet. Please try again with the QR code below."

As discussed with respect to FIG. 2B, the title field 222 may provide an indication that the user interface 260 is intended to provide verification. Instructions 224 may provide instructions on how to send a message with the deep link included in replacement QR code 264. Selection of the deep link included in replacement QR code 264 may generate a message (e.g., message 252 of FIG. 2C). The message generated with replacement QR code 264 may be addressed to a different destination than message 252. Illustratively, the message generated with replacement QR code 264 may be addressed to "2345" instead of "1234," as specified in address box 246 of FIG. 2C. Alternatively, the message generated with replacement QR code 264 may include a different unique identifier than specified in message 252 of FIG. 2C. Illustratively, the message generated with replacement QR code 264 may specify a unique identifier of "6789."

As discussed with respect to FIG. 2B, links 228 and 230 may be selected to provide the user with alternate means to provide verification. The user may select link 228 to generate a new QR code. The user may additionally, or alternatively, select the link 230 to contact a support service. The support service may be part of the verification system 112.

Figure 3:
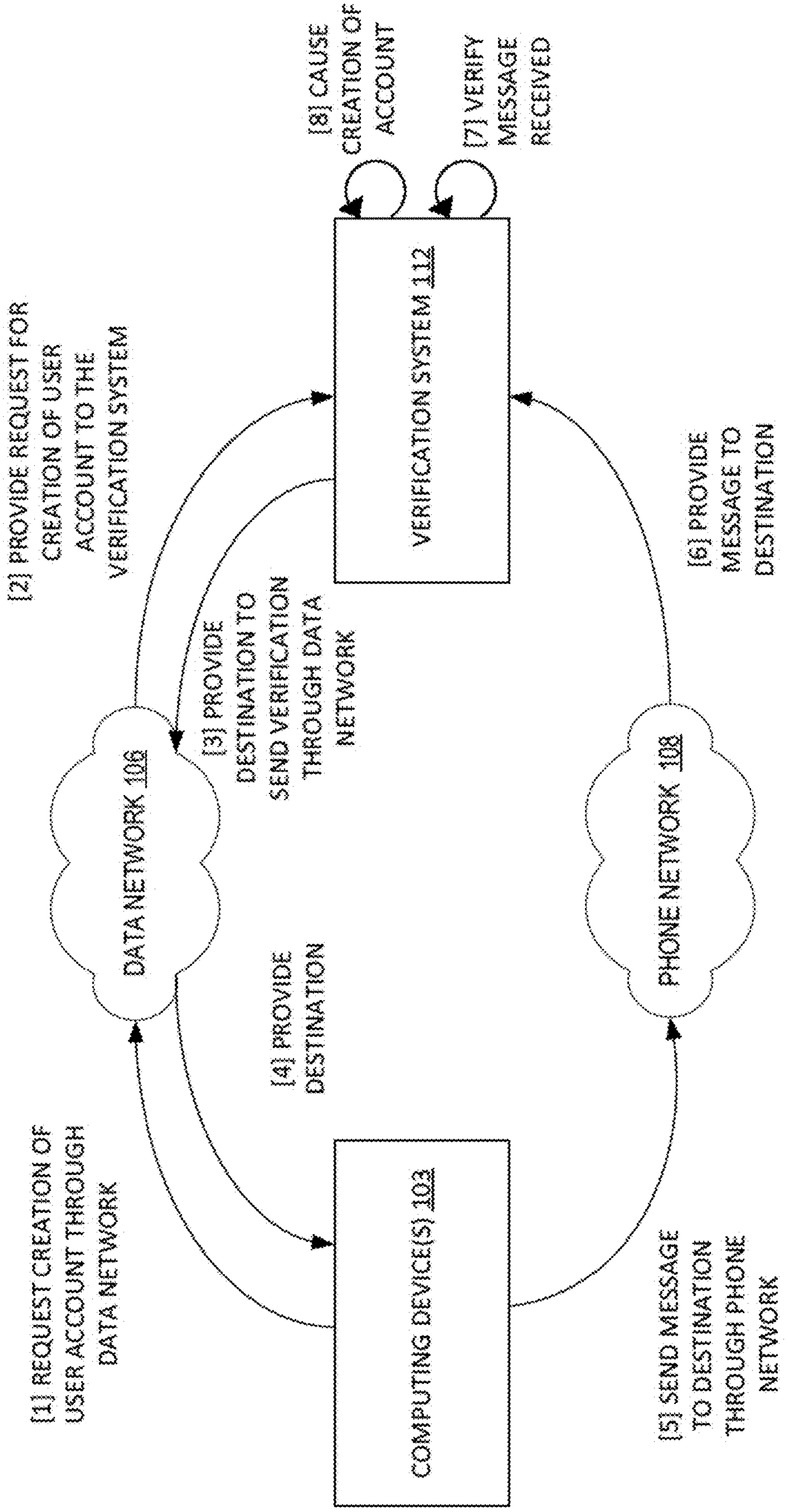
FIG. 3 illustrates example interactions between computing device(s) and a verification system in verifying a request, in accordance with some aspects of the disclosure.

Example Interactions to Conduct Telephony Based Verification for Account Creation Request FIG. 3 illustrates example interactions between a computing device 102 and the verification system 112 in verifying a request for an action from a service (e.g., service(s) 110 of FIG. 1), in accordance with some aspects of the disclosure. At [1], a computing device of computing device(s) 103 may request creation of an account through the data network 106. Illustratively, computing device 102 may request creation of the account with application 120. Computing device 102 may be in communication with a specific service 110 through application 120. For example, the service 110 may have a website, and application 120 may be a browser displaying a page corresponding to the service 110. The browser page may include a link to create an account, and a user, through computing device 102, may select that link.

On selecting the link, the user may be presented with user interface 200 of FIG. 2A. As discussed in FIG. 2A, user interface 200 may allow service 110 to access user input relating to creation of an account with the service 110. The service 110 may take further action based on this input. Illustratively, the service 110 may call verification system 112 to verify the request. On verification of the request, the service 110 may create the account. Alternatively, the user interface 200 may be configured by an administrator of service 110 to cause the request to be provided to verification system 112.

At [2], the data network 106 may provide the request to the verification system 112. As discussed with respect to FIG. 1, data network 106 may be a packet-switched data network. Illustratively, data network 106 may be a publicly-accessible network of linked networks, possibly operated by various distinct parties, such as the Internet.

The verification system 112 may, in some cases, determine that no inbound telephony-based verification is required. If so, [3]-[8] below would be omitted. The determination that no telephony-based verification is required may be based on characteristics of the request, such as phone number, location, network address, behavior of the user (e.g., number of repeated visits by the user), the like, or some combination thereof. Illustratively, the request to create an account may include a phone number with a country code or area code corresponding to a low level of risk. With reference to FIG. 2A, a country code of "+X" or an area code of "XXX," as provided in contact field 206, may correspond to a low level of risk based on data in data store(s) 114. Accordingly, the verification system 112 may determine that no inbound telephony-based verification is required for the request to create an account.

As another example, a user may submit the request to create an account through data network 106 with computing device 102. The computing device 102 may correspond to a network address (e.g., an IP address). The network address may correspond to a low-level of risk based on data in data store(s) 114. Accordingly, the verification system 112 may determine that no telephony based verification is required for the requested account to be created.

In the above examples, the verification system 112 determined that inbound telephony-based verification was not required based on one characteristic of the request. This is not intended to be limiting. In some embodiments, verification system 112 may determine whether or not inbound telephony-based is required based on a combination of characteristics of the request. As discussed above, characteristics of the request may include, but are not limited to phone number, location, network address, behavior of the user (e.g., number of repeated visits by the user), the like, or some combination thereof. Illustratively, the verification system 112 may determine that inbound telephony-based verification is not required only if the risk level for a phone number corresponding to the request and the risk level for a network address corresponding to the request are both low.

Additionally, the example above referenced a phone number included in a request to create an account. This is also not intended to be limiting. In some examples, the user may already have an account with a service 110. In further examples, the user may submit a request to add two-factor authentication to the account with a phone number, such as +Y (YYY)-YYY-YYYY. The verification system 112 may determine whether or not inbound telephony-based verification is required based on the phone number included in the two-factor authentication request.

As another example, the user may submit a request for an OTP to access the account with computing device 104 of FIG. 1. Computing device 104 may correspond to a phone number, such as +Z (ZZZ)-ZZZ-ZZZZ. The verification system 112 may determine whether or not to conduct inbound telephony-based verification based on the phone number corresponding to computing device 104. Determinations by the verification system 112 on whether or not to conduct verification will be discussed in more detail in FIG. 5.

At [3], the verification system 112 may provide, through the data network 106, a specified destination to send a verification message (e.g., message 252 of FIG. 2C) through the phone network 108. Communications from verification system 112 at [3] may include instructions on how to send the verification message in addition to the destination. For example, the verification system 112 may generate a user interface, such as user interface 220 of FIG. 2B. As discussed with respect to FIG. 2B, user interface 220 includes a QR code 226. QR code 226 may be embedded with a deep link. Accordingly, following instructions 224 may cause the deep link to be selected. Note that a different computing device may be needed to follow the instructions 224. For example, if computing device 102 was used at [1] to send the request for creation of the account, then computing device 104 may be used to follow instructions 224 and send a message. Sending the message may serve as sending the verification. Sending a message from computing device(s) 103 to the destination will be discussed in more detail at [5]. On selection, the deep link may open a messaging app for communication through phone network 108, which may present the user with user interface 240 of FIG. 2C.

While the illustrative example above, with respect to FIG. 2B, discussed presenting a QR code embedded with a deep link to a user, this is not intended to be limiting. In some embodiments, instead of presenting a QR code through a user interface, such as user interface 220 of FIG. 2B, the verification system 112 may cause another type of barcode (e.g., a data matrix code) to be presented to the user. The user may scan the barcode with another computing device, such as computing device 104 to follow the instructions 224. The other type of barcode may also be embedded with a deep link that opens a messaging app and generates a draft message for communication through a phone network, as discussed above with respect to FIG. 2B. The message may be populated with the destination provided at [3], which may be an SMS short code.

As another example, the verification system 112 may cause the deep link to be presented to the user as a hyperlink. Selection of the hyperlink may cause a messaging app for communication through a phone network to open and may cause a draft message to be generated and addressed to the destination provided at [3]. The draft message may also include a verification code unique to the request. The same computing device that sent the request at [1] may then be used to send a message to the destination, as will be discussed in more detail with respect to [5].

As yet another example, the verification system 112 may cause a user interface to be presented to the user including a textual indicator for the destination. Illustratively, the user interface may include an indicator to show that a destination is being presented and the value of the destination. For example, the user interface may include an indicator with the language "message destination" followed by a value of "1234." The destination may be an SMS short code, as will be discussed in more detail at [5]. The user interface may further include an indicator with the language "verification code" followed by a value of "5678." The user may then open a messaging app for sending messages through a phone network, address the message to the destination of "1234," and include the verification code of "5678" in the message. The user may then submit the message.

At [4], the data network 106 may provide the destination to computing device(s) 103. With continued reference to the illustrative example, the data network 106 may present the destination to computing device 102 through application 120.

At [5], computing device(s) 103 may send a message to the destination through phone network 108. Illustratively, a user through computing device 102 may submit the request for creation of the user account through the data network at [1]. Computing device 102 may receive the destination from verification system 112 at [4]. A user through computing device 104 may follow instructions 224 of FIG. 2B to generate a message to the destination specified at [3]. As discussed with respect to FIG. 2B and [3], the destination may be specified as an embedded deep link within QR code 226. Selection of the deep link may require another computing device to capture the QR code and select the deep link as provided in instructions 224. Selection of the deep link may open a messaging app for communication through a phone network, which may have an interface similar to user interface 240 of FIG. 2C. With continued reference to FIG. 2C, submission of the message through buttons 250 or 254 may send the message through the phone network 108.

At [6], the phone network 108 may provide the message to the destination. As discussed at [3]-[5], the destination may be an SMS short code. The messaging app may be configured to send messages to the destination for verification through the phone network 108, as discussed at [3]-[5]. This may advantageously provide a deterrent to bad actors fraudulently using the verification interactions described herein to increase traffic on phone network 108. Requiring the user to send an inbound message through the phone network 108 for verification increases network costs for the bad actors, as discussed above. Illustratively, sending verification instructions through data network 106, but requiring a response through phone network 108, increases the number of resources the bad actors would need to devote to increasing traffic on the phone network 108.

At [7], verification system 112 may verify that the message has been received. The destination may be included in verification system 112. Alternatively, the verification system 112 may be notified once the message has been received at the destination. For example, the verification system may be notified by a service in communication with the destination. By way of illustration, an administrator of the verification system 112 may configure an API to watch the destination for received messages. On receipt of the message at the destination, the API may notify the verification system 112 that the message has been received. The API may also inform the verification system 112 about the contents of the message, such as the subject. Alternatively, after receiving notification, the verification system 112 may download the message to extract its content.

At [8], verification system 112 may cause the creation of the requested user account. Illustratively, the verification system 112 may send a message indicating that the request has been verified to the service to which the request was directed. Additionally, or alternatively, the verification system 112 may send message to the service for which the account is requested indicating that computing device(s) (e.g., laptop. phone, etc.) corresponding to the user has been verified. On receipt of the message, the service may create the requested account.

Figure 4:
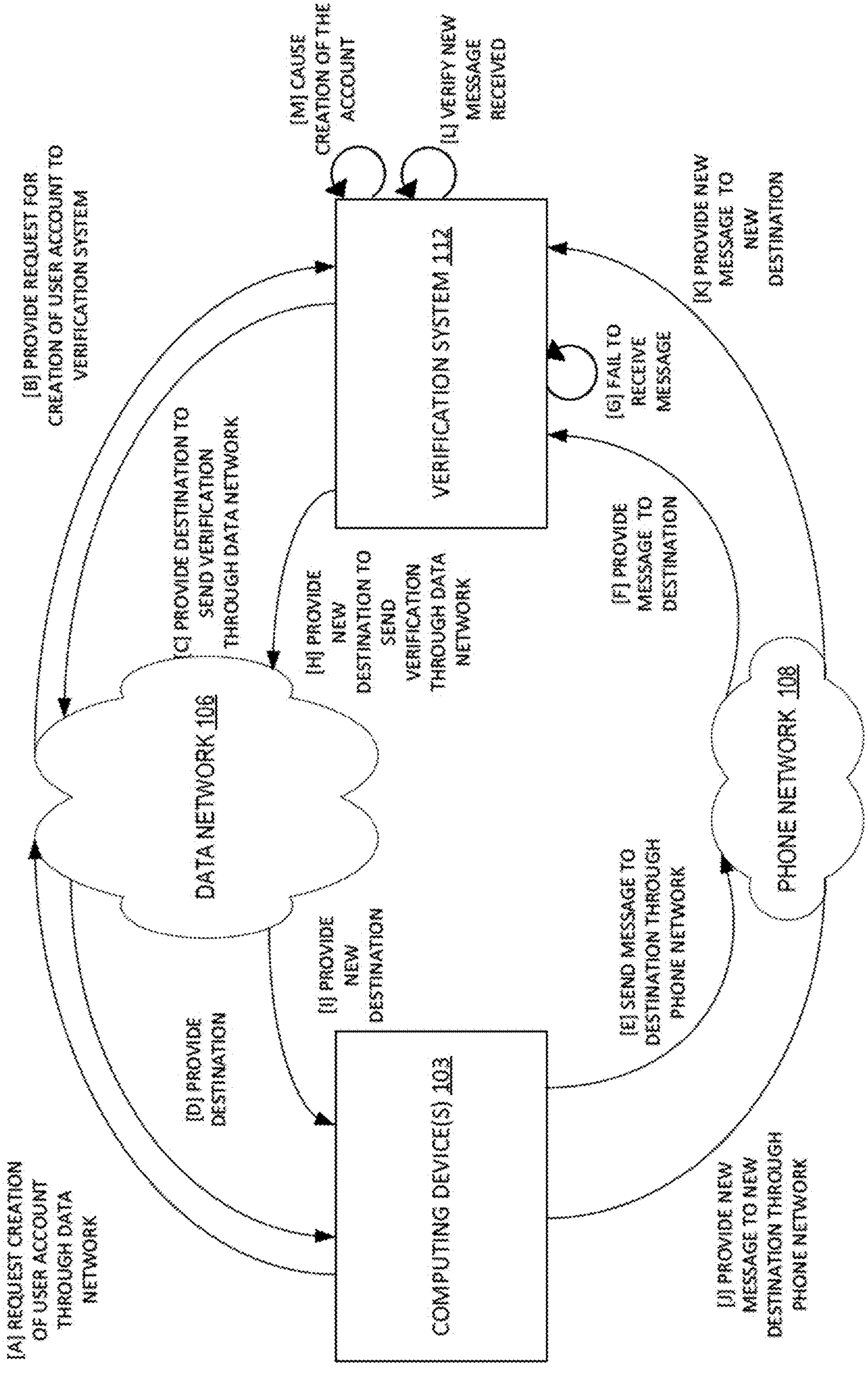
FIG. 4 illustrates example interactions between computing device(s) and a verification system resolving a failure to receive an inbound telephony-based verification message, in accordance with some aspects of the disclosure.

FIG. 4 illustrates example interactions between computing device(s) 103 and verification system 112, in accordance with some aspects of the disclosure. The interactions shown at FIG. 4 may illustrate a verification flow where the verification system 112 does not receive a message sent to the specified destination for verification, as discussed in FIG. 3 with respect to [7]. The interactions advantageously provide a method to verify that the request is fraudulent while allowing genuine users with a process to receive the result of their request (e.g., creation of an account, two-factor authentication, one-time passcode, etc.).

At [A], a computing device of computing device(s) 103 may request the creation of a user account ("account creation request" for brevity) from a service of service(s) 110. As discussed with respect to FIG. 3 at [1], the service(s) 110 may call the verification system 112 on receipt of the request. Accordingly, while not shown, the service(s) 110 may receive the account creation request through data network 106 and forward the account creation request to the verification system 112 through the data network 106. Alternatively, the service(s) 110 may be configured to receive such requests.

At [B], the data network 106 may provide the account creation request to the data network 106. As discussed above with respect to FIG. 1 and FIG. 3, data network 106 may be a packet-switched data network. Illustratively, data network 106 may be a publicly-accessible network of linked networks, possibly operated by various distinct parties, such as the Internet. The verification system 112 may, in some cases, determine that no verification is required. If so, [C]-[M] below would be omitted. The determination may be based on characteristics of the request (e.g., phone number, location, network address, behavior of the user, etc.), as discussed above with respect to FIG. 3. Determinations by the verification system 112 on whether or not to conduct verification will be discussed in more detail in FIG. 5.

At [C], the verification system 112 may provide a destination to send verification through the data network 106. The destination may be provided to computing device 102 of computing device(s) 103. As discussed with respect to FIG. 3 at [3], the verification system 112 may generate a user interface including a deep link (e.g., user interface 220 of FIG. 2B). The verification system 112 may include the deep link in a variety of ways including, but not limited to, a hyperlink, a barcode (e.g., a QR code, a data matrix code, etc.), as a textual message, as a visual message, the like, or some combination thereof. On selection, the deep link may open a messaging app for communication through phone network 108. The deep link may further generate a draft message auto-populated with the destination as the address, as described with respect to user interface 240 of FIG. 2C. In some examples, other information, such as a subject 248 of FIG. 2C or the text of message 252 ("Please verify may identity:") may be included in the auto-populated message.

While the example above discusses selection of a deep link to generate a draft message to the destination, this is not intended to be limiting. For example, the verification system 112 may provide the destination as text. Illustratively, the verification system 112 may provide a textual message through data network 106 including the language "send the text 'confirm request; verification code: 5678' to SMS short code '1234' for verification." The user may then open a messaging app, enter the text 'confirm request; verification code: 5678' into the body of the message, address the message to SMS short code '1234' and send the message.

At [D], the data network 106 may provide the destination to computing device(s) 103. With continued reference to the illustrative example, the data network 106 may present the destination to computing device 102 through application 120.

At [E], computing device(s) 103 send a message to the destination through phone network 108. As discussed with respect to FIG. 3 and [C], a user through a computing device (e.g., computing device 102, computing device 104, etc.) may send a message to the destination through a messaging app. The messaging app may be configured to send messages through the phone network 108. This may advantageously provide a deterrent to bad actors using the verification interactions described herein to increase communications on phone network 108.

At [F], the phone network 108 may provide the message to the destination. As discussed with respect to FIG. 3 and [C]-[E], the destination may be an SMS short code. Methods for providing a message through a phone network to an SMS short code are well understood in the art and will accordingly not be discussed in detail here.

At [G], the verification system 112 may fail to receive the message sent at [E]. Failure to receive the message may occur because phone network 108 dropped the message. By way of illustration, computing device 102 may send the message addressed to the destination at [E]. The phone network 108 may subsequently drop the message prior to [F]. Accordingly, the verification system 112 may fail to receive the message at [G].

As another example, computing device(s) 103 may not send the message at [E]. The verification system 112 may set a timeout for receipt of the message at the destination. In other words, if the user does not send a message to the destination within a specified period of time, the verification system 112 may fail to receive the message at [G].

As yet another example, computing device(s) 103 may make an error in sending the message at [E]. For example, the destination may be "1234." The user may make a mistake in manually entering the destination and instead enter "1235," which is incorrect. Alternatively, the user may accidently modify an automatically-generated draft message created on selection of a deep link, as described above. The modification may render at least one of the destination or unique identifier (e.g., verification code) incorrect. Accordingly, verification system 112 may fail to receive the message at [G].

If the verification system 112 fails to receive the message at [G], the verification system 112 may provide a new destination at [H]. The new destination may be provided to the computing device which sent the request at [A]. By way of illustration, a user may utilize computing device 102 to send the account creation request through the data network 106 at [A]. With reference to FIG. 2B, the destination may be provided at [D] as a deep link embedded in QR code 226. A user may utilize a different computing device, such as computing device 104, to follow instructions 224 and select the deep link. Accordingly, the computing device 104 may send the message at [E] through the phone network 108. However, the new destination may be directed to computing device 102, which sent the request.

The above example is not intended to be limiting. In some examples, the same computing device may send the messages at [A] and [E]. Illustratively, the user may send the account creation request at [A] through computing device 102. The verification system 112 may provide the deep link as a hyperlink at [C], and the user may select the hyperlink on computing device 102. The user may then send an autogenerated message created on selection of the link (e.g., message 252) to the destination with computing device 102 at [E].

To provide the new destination, the verification system 112 may utilize a user interface, such as user interface 260 of FIG. 2D. With reference to FIG. 2D, the verification system 112 may include a failure indicator, such as failure indicator 262. As illustrated, failure indicator 262 includes the language: "[w]e haven't received your message yet. [p]lease try again with the QR Code below." This language may serve to indicate that the verification system 112 failed to receive a message at the destination. Alternatively, the language may service to indicate that the verification system 112 failed to receive a message at the destination including the unique identifier (e.g., verification code) corresponding to the request, as described with respect to FIG. 2C.

The language further provides instructions to try again with replacement QR code 264. Replacement QR code 264 may be embedded with a deep link configured to generate a draft message addressed to the new destination. With reference to FIG. 2C, the message 252 may be addressed to "2345" instead of "1234." Additionally, or alternatively, replacement QR code 264 may be embedded with a deep link configured to generate a draft message with a new unique identifier. With reference to FIG. 2C, the message 252 may include the unique identifier "6789" instead of "5678."

At [I], the new destination may be provided to the computing device(s) 103. Illustratively, the destination may be provided to computing device 102. In some examples, the destination may be provided as a hyperlink or a textual message including the destination (e.g., "send a message to SMS short code '6789.'" A user, through computing device 102, may then provide a new message to the new destination at [J].

Alternatively, a user, through computing device 104 may provide a new message to the new destination at [J]. At [I], the new destination may be received as part of a user interface with a QR code, such as user interface 260 of FIG. 2D. The user interface may be presented on computing device 102. Accordingly, the user may use computing device 104 to follow the instructions 224 to send a message to the new destination.

At [J], the computing device(s) 103 may provide the new message to the new destination through the phone network 108. As discussed, the new destination may be SMS short code specified by the verification system 112. Accordingly, the new message may be an SMS message sent to the specified short code. While the example above provides that the new message is sent to a new destination, this is not intended to be limiting. In some examples, the destination may remain the same, but the unique identifier may change in the new message. With reference to FIG. 2C, the address box 246 may still include the destination "1234," but the message 252 may be updated from "5678" to "6789."

At [K], the phone network 108 may provide the new message to the new destination. As discussed, the new destination may be an SMS short code specified by the verification system 112. Accordingly, the new message may be an SMS message provided by the phone network 108 to the specified short code.

At [L], the verification system 112 may verify that the new message was received at the new destination. The new destination may be included in verification system 112. Alternatively, the verification system 112 may be notified once the message has been received at the new destination. For example, the verification system 112 may be notified by a service in communication with the destination. By way of illustration, an administrator of the verification system 112 may configure an API to watch the new destination for received messages. On receipt of the new message at the new destination, the API may notify the verification system 112 that the new message has been received. The API may also inform the verification system 112 about the contents of the new message, such as the subject. Alternatively, after receiving the notification, the verification system 112 may download the new message to extract its content.

At [M], verification system 112 may cause the creation of the requested user account. Illustratively, as discussed with respect to FIG. 3 at [8], the verification system 112 may send a message to the service for which an account is requested indicating that the request has been verified. On receipt of the message, the service may create the requested account.

Example Method to Conduct Inbound Telephony-Based Verification

Figure 5:
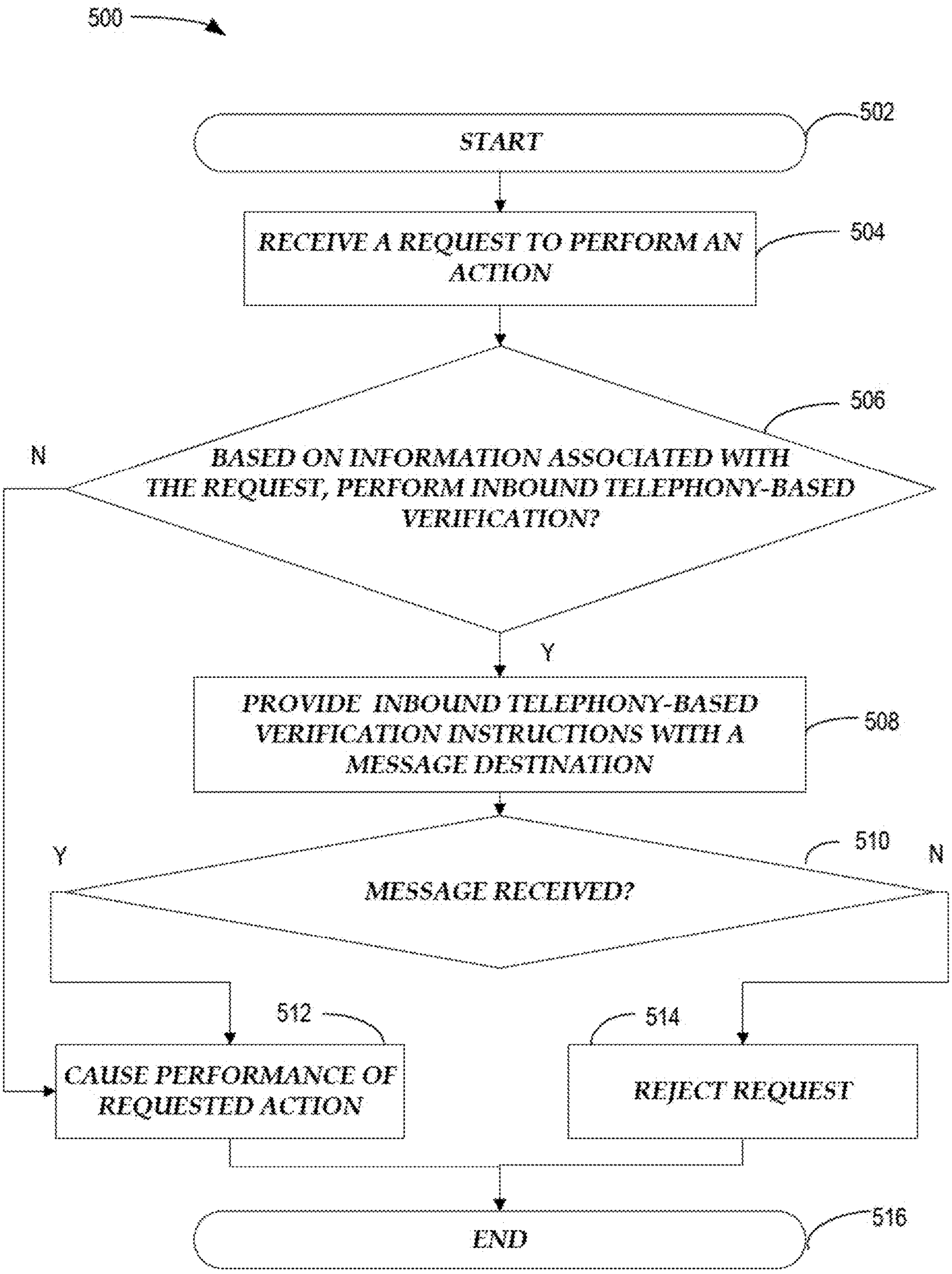
FIG. 5 illustrates an example method for inbound telephony-based verification, in accordance with some aspects of the disclosure.

FIG. 5 illustrates an example method 500 for inbound telephony-based verification. Method 500 begins at block 502. At block 504, the verification system 112 may receive a request to perform an action. The action may include a request to create an account, as described above with respect to FIGS. 2A-4 above. Other requested actions are possible including, but not limited to, a request to place an order, a request to update user profile information (e.g., phone number, email, password, payment information, etc.), a request to add two-factor authentication to an account, or a request to log in to an account, such as with two factor authentication or with an OTP.

A user may request two-factor authentication after creation of an account. By way of illustration, a user may go into account settings and add a phone number for two factor authentication. The addition of the phone number may constitute a request to enable two-factor authentication. This request may trigger the verification system 112 to perform additional verification through the phone network 108, as will be discussed in more detail below.

With respect to an OTP request, a user may also make this request after creation of the account. As one example, a user may request an OTP if they have forgotten their password. A user's request of the OTP may trigger the verification system 112 to perform additional verification through the phone network 108, as will be discussed in more detail below.

At block 506, based in information associated with the request, the verification system 112 may determine whether to perform inbound telephony-based verification. The determination may be based on information associated with the request. With respect to the example of creating an account, the request may include a phone number, an email address, or the like.

As discussed with respect to FIGS. 2A-4, the phone number may include a country code corresponding to a risk level above a specified threshold. By way of illustration, an administrator of the verification system 112 may include a specified threshold for risk in data store(s) 114 of FIG. 1. The administrator may further include a list of characteristics of requests, such as phone number, network address, or the like, in data store(s) 114. Based on the combined risk of such characteristics, the verification system 112 may provide inbound telephony-based verification instructions including a message destination at 508.

With continued reference to FIGS. 2A-4, the user may submit a request for an action through a computing device (e.g., computing device(s) 103 of FIGS. 1, 3 and 4). The request may include a phone number. With reference to FIG. 2A, the request may include the phone number +X (XXX)-XXX-XXXX. The computing device may correspond to a network address, such as an IP address. Each of the phone number and network address may correspond to a risk level. As one example, the country code of the phone number (e.g., the country code "+X") may correspond to a high risk level in a list included in data store(s) 114. The network address may correspond to a medium level of risk in a list included in the data store(s) 114. The verification system 112 may determine the level of risk based on the risk level corresponding to the country code of the phone number and based on the risk level corresponding to the network address of the computing device. The determined risk level for the request may be above a medium risk level. The specified threshold for risk may be a medium risk level. Accordingly, based on the determined risk level for the request and the specified threshold, the verification system 112 may determine to provide inbound telephony-based verification instructions with a message destination at block 508.

While the risk levels in the example above were given in terms of "low," "medium," and "high," this is not intended to be limiting. In some examples, the risk levels may be provided in terms of numbers. The verification system 112 may average numbers corresponding to characteristics of the request (e.g., phone number, location, network address, behavior of the user, etc.) to generate a determined score for the request. Based on the determined score exceeding a specified threshold, the verification system 112 may determine to provide inbound telephony-based verification instructions (e.g., SMS verification instructions) with a message destination at block 508.

At block 508, the verification system 112 may provide inbound telephony-based verification instructions with a message destination. The inbound telephony-based verification instructions may further include a unique identifier for the request (e.g., verification code). In some examples, the unique identifier may be generated with a random number generator including, but not limited to a pseudo random number generator (PRNG), a true random number generator (TRNG). Methods for implementing random number generators are well known in the art, so further detail on these generators will not be provided herein. The random number generator may be part of the verification system 112. Alternatively, the random number generator may be an external service (e.g., an API).

In further examples, the verification system 112 may call the random number generator after determining to perform inbound telephony-based verification at block 506. On receipt of the unique identifier, the verification system 112 may incorporate the unique identifier into the inbound telephony-based instructions. The verification system 112 may then provide the inbound telephony-based verification instructions to a user through a computing device (e.g., computing device(s) 103 of FIGS. 1, 3, and 4).

In some examples, the inbound telephony-based verification instructions may be SMS verification instructions. The inbound telephony-based verification instructions may be provided as part of a user interface. With reference to FIG. 2B, the verification system 112 may generate user interface 220 with instructions 224. The user interface 220 may be provided to the user through computing device 102. As discussed with respect to FIGS. 2A, 3, and 4, instructions 224 may instruct the user on how to complete inbound telephony-based verification with a deep link embedded in QR code 226.

At block 510, the verification system 112 may determine whether the message has been received. As discussed in FIGS. 3-4, the verification system 112 may include the message destination. Accordingly, when a message is received at the destination, the verification system 112 may proceed to block 512 to cause the performance of the requested action. Alternatively, the verification system 112 may use a service, such as an API, to watch for messages arriving at the message destination. On receipt of a message at the message destination, the service may notify the verification system 112. Once the verification system 112 determines that a message has been received at the destination, the verification system 112 may proceed to block 512 to cause performance of the requested action. In some examples, after a message has been received at the destination, the verification system 112 may analyze the message to determine whether the message includes the unique identifier corresponding with the request. If so, the verification system 112 may proceed to block 512 to cause performance of the requested action.

In some examples, prior to causing performance of the requested action at block 512, the verification system 112 may confirm that the message includes a unique identifier provided in the inbound telephony-based verification instructions at block 508. The unique identifier may be unique to the request. Illustratively, the verification system 112 may be configured to receive multiple requests within a time range. Each request may receive the same destination, but a different unique identifier. By way of example, the destination for all requests may be "1234." However, a first request may have the unique identifier "2345," a second request may have the unique identifier "3456," and a third request may have the unique identifier "4567." The verification system 112 may accordingly determine whether a message for each request has been received based on the unique identifier in messages received at the destination.

In some examples, the verification system 112 may determine that a message has not been received at the destination. The verification system 112 may make this determination based on a specified timeout. The specified timeout may be a period of time after which the verification system 112 may determine that a message has not been received at block 510.

The specified timeout may be measured from when verification system 112 sends the inbound telephony-based verification instructions at block 508. In some examples, the duration of the specified timeout may be set by an administrator of verification system 112.

At block 512, the verification system 112 may cause performance of the requested action. By way of illustration, the verification system 112 may determine, at block 510, that a message was received at the destination. The verification system 112 may further determine that the message includes a unique identifier corresponding to the request. The verification system 112 may then proceed to block 512. To cause performance of the requested action, the verification system 112 may notify the service that the request has been verified. The service may then perform the requested action.

At block 514, the verification system 112 may reject the request. To reject the request the verification system 112 may send a textual message through the data network 106 indicating that the request has been rejected. Illustratively, the textual message may include the language, "the request has been rejected." In some examples, the textual message may be embedded in a user interface, such as user interfaces 200, 220, 240, and 260 of FIGS. 2A-2D.

In some examples, to reject the request, the verification system 112 may allow the user another opportunity to provide the verification. For example, the verification system 112 may repeat blocks 508-512 with a new message destination. As another example, the verification system may repeat blocks 508-512 with a new unique identifier for the request. Illustratively, with reference to FIG. 2D, the verification system 112 may provide the user interface 260. The user interface 260 includes a replacement QR code 264 with an embedded deep link. Selection of the deep link may auto-populate a message to the new message destination and/or the new unique identifier. The user may then send the new message. The verification system 112 may determine that the new message has been received at block 510. Subsequently, the verification system 112 may cause the performance of the requested action at block 512.

The method 500 ends at block 516.

Example Hardware for Verification System

Figure 6:
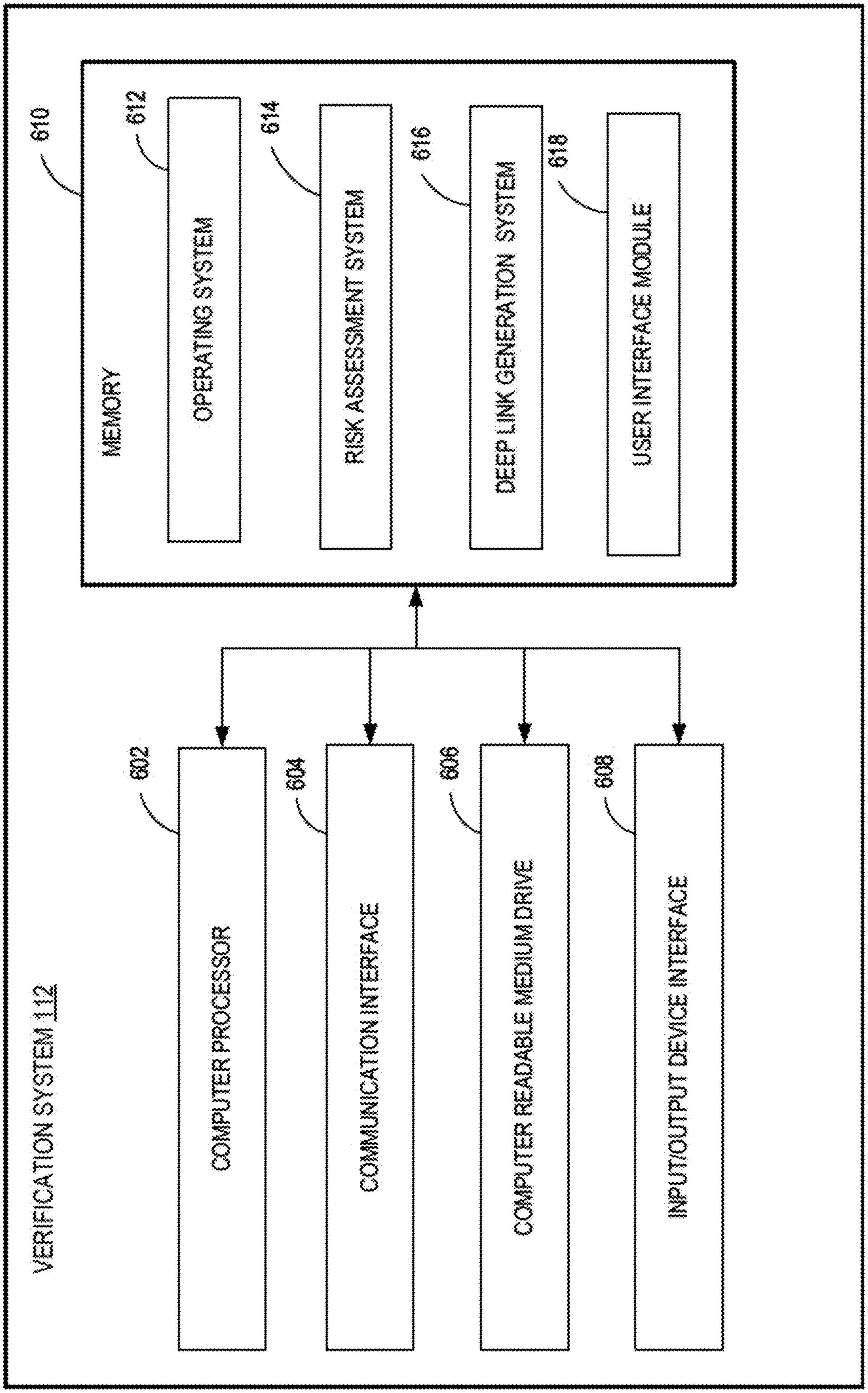
FIG. 6 illustrates a general architecture for a verification system including an arrangement of computer hardware and software that may be used to implement aspects of the present disclosure.

FIG. 6 illustrates a general architecture for a verification system 112 including an arrangement of computer hardware and software that may be used to implement aspects of the present disclosure. The hardware may be implemented on physical electronic devices, as discussed in greater detail below. The verification system 112 may include more (or fewer) elements than those shown in FIG. 6. It is not necessary, however, that all of these generally conventional elements be shown in order to prescribe enabling disclosure. Additionally, the general architecture stated in FIG. 6 may be used to implement one or more other components illustrated in FIG. 1.

As illustrated, the verification system 112 includes a computer processor 602, a communication interface 604, and a memory 610, all of which may communicate with one another by way of a communication bus. The communication interface 604 may provide connectivity to one or more networks or computing systems. The computer processor 602 may thus receive information and instructions from other computing systems or services, such as computing device 102. The processor 602 may also communicate to and from memory 610 and further provide output information for an optional display (not shown) via the input/output device interface 608. The input/output device interface may also accept input from an optional input device (not shown).

The computer-readable medium drive 606 may be used in storing data and code. Illustratively, the computer-readable medium drive 606 may be a hard drive that stores data and code. In some examples, the computer-readable medium drive 606 may be an external hard drive communicatively coupled to the verification system 112 (e.g., through a cable). Alternatively, the computer-readable medium drive may be internal to the verification system 112. In some examples, the computer-readable medium drive 606 may be used to carry out any of the functions described below with respect to memory 610.

The memory 610 may store an operating system 612 that provides computer program instructions for use by the computer processor 602 in the general administration and operation of the verification system 112. Memory 610 may further include computer program instructions and other information for implementing aspects of the present disclosure.

For example, the verification system 112 may include one or more components to carry out the functions described above, such as risk assessment system 614 and deep link generation system 616. Illustratively, the risk assessment system 614 may assess risk of a request based on data in data store(s) 114.

With respect to risk assessment system 614, the memory 610 may also include computer program instructions and information for implementing risk assessment system 614. Risk assessment system 614 may illustratively assess a risk level for a request based on characteristics of the request, such as phone number, location, network address, behavior of the user (e.g., number of repeated visits by the user), the like, or some combination thereof. The risk assessment system 614 may access characteristics of the request after receipt of a request. In some examples, to assess risk, the risk assessment system 614 may access other instructions stored in the memory 610 relating to risk categories for country codes, area codes, or network addresses. By way of illustration, a phone number with a country code of '+X' may be at a high risk level. The risk level corresponding to country code of '+X' may be stored in a risk database accessible to risk assessment system 614. For example, the risk database may be stored with risk assessment system 614 in memory 610. Based on the level of risk corresponding to the country code of '+X,' the risk assessment system 614 may determine that a request corresponding the country code of '+X,' has a high level of risk. Based on the determination, the verification system 112 may request that a user provide inbound telephony-based verification.

Turning to deep link generation system 616, deep link generation system 616 may generate deep links to facilitate conduction of inbound telephony-based verification. The generated deep links may be configured to open a messaging app on a computing device (e.g., computing device(s) 103) with a draft message addressed to a specified destination (e.g., an SMS or MMS short code). Illustratively, the verification system 112 may call the deep link generation system 616 after making a determination to perform inbound telephony-based verification, as described above with respect to FIGS. 3-5. With continued reference to the illustrative examples of FIGS. 3-5, the verification system 112 may incorporate the deep link generated by deep link generation system 616 into instructions for inbound telephony-based verification and provide these instructions to computing device(s) 103.

As another example, the memory 610 may also include computer program instructions and information for implementing deep link generation system 616. The verification system 112 may use the deep link generation system 616 to generate the deep links to be provided by the verification system 112 through a computing device (e.g., computing device(s) 103 of FIG. 1). The deep links may be included in barcodes, such as QR codes, data matrix codes, or the like.

In some examples, memory 610 may also include a user interface module 618 for generating user interfaces or instructions therefore that's not shown that user interest model could generate the user interfaces for display upon a computing device, such as computing device(s) 103 of FIG. 1 (e.g., via a navigation or browsing interface such as a browser or application installed on the computing device). In some examples, the processor 602 may access instructions from that memory 610 to generate the display. In some examples, user input might be received through the display as discussed above. The verification system 112 of FIG. 6 is one illustrative configuration of such a device, of which others are possible. For example, while shown as a single device, the verification system 112 may, in some examples, be implemented as multiple physical devices.

Terminology and Other Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some examples, the computer system may be a cloud-based computing system whose processing resources are shared by multiple distinct business entities or other users.

Depending on the example, certain acts, events, or functions of any of the processes or algorithms described herein can be performed in a different sequence, can be added, merged, or left out altogether (e.g., not all described operations or events are necessary for the practice of the algorithm). Moreover, in certain examples, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the examples disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the examples disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another example, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the examples disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements and/or steps. Thus, such conditional language is not generally intended to imply that features, elements and/or steps are in any way required for one or more examples or that one or more examples necessarily include logic for deciding, with or without other input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various examples, it can be understood that various omissions, substitutions, and changes in the form and details of the devices or algorithms illustrated can be made without departing from the spirit of the disclosure. As can be recognized, certain examples described herein can be embodied within a form that does not provide all of the features and benefits set forth herein, as some features can be used or practiced separately from others. The scope of certain examples disclosed herein is indicated by the appended claims rather than by the foregoing description. All changes which come within the meaning and range of equivalency of the claims are to be embraced within their scope.

What is claimed is:

1. A system comprising:

a computer-readable memory storing executable instructions; and one or more processors programmed by the executable instructions to:

receive input from a computing device through a data network, wherein the input comprises a request to perform an action;

determine to perform telephony-based message verification prior to performance of the action;

provide the computing device with verification instructions through the data network to send a message through a phone network to a specified destination, wherein the verification instructions include a deep link, wherein selection of the deep link generates a draft of the message, and wherein the draft of the message is addressed to the specified destination; and on receipt of the message through the phone network, cause performance of the action.

2. The system of claim 1, wherein the deep link is embedded in a bar code, and wherein the bar code includes at least one of a QR code or a data matrix code.

3. The system of claim 1, wherein the action is at least one of account creation, an update to user profile information, addition of a phone number for two factor authentication, generation of a one-time passcode, or a product order.

4. The system of claim 1, wherein the computing device is further associated with a network address; and wherein the determination to perform telephony-based verification is based on at least one of a risk level for the network address, a risk level for a phone number corresponding to the request, or a risk threshold for behavior of a user corresponding to the request.

5. The system of claim 1, wherein the one or more processors are further programmed by computer-executable instructions to:

determine that a specified timeout period has been exceeded for receipt of the message; and provide new verification instructions to the computing device through the data network, wherein the new verification instructions comprise a new destination.

6. The system of claim 1, wherein the one or more processors are further programmed by computer-executable instructions to:

determine that the message has been dropped by the phone network; and provide new verification instructions to the computing device through the data network, wherein the new verification instructions comprise a new destination.

7. The system of claim 1, wherein the verification instructions include a unique identifier for the request to perform an action.

8. The system of claim 7, wherein the one or more processors are further programmed by executable instructions to:

determine that a specified timeout period has been exceeded for receipt of the message; and provide new verification instructions to the computing device through the data network, wherein the new verification instructions comprise a new unique identifier.

9. The system of claim 7, wherein the one or more processors are further programmed by executable instructions to:

receive multiple messages at the specified destination;

identify the message corresponding to the request to perform the action based on the unique identifier; and on identification of the message, cause performance of the action.

10. A computer-implemented method, the computer-implemented method comprising:

under control of a computing system comprising one or more processors programmed by specific computer-executable instructions, receiving input from a computing device through a data network comprising a request to perform an action;

determining to perform telephony-message-based verification prior to performance of the action;

providing the computing device with verification instructions through the data network to send a message through a phone network to a specified destination, wherein the verification instructions include a deep link, wherein selection of the deep link generates a draft of the message, and wherein the draft of the message is addressed to the specified destination; and on receipt of the message through the phone network, causing performance of the action.

11. The computer-implemented method of claim 10, wherein determining to perform telephony-message-based verification comprises determining at least one of a risk level for a network address corresponding to the request, a risk threshold for a phone number corresponding to the request, or a risk threshold for behavior of a user corresponding to the request.

12. The computer-implemented method of claim 10, further comprising:

determining that a specified timeout period has been exceeded for receipt of the message; and providing new verification instructions to the computing device through the data network, wherein the new verification instructions comprise a new destination.

13. The computer-implemented method of claim 10, wherein providing the computing device with verification instructions comprises including a unique identifier for the request to perform an action.

14. The computer-implemented method of claim 13, further comprising:

determining that a specified timeout period has been exceeded for receipt of the message; and providing new verification instructions to the computing device through the data network, wherein the new verification instructions comprise a new unique identifier.

15. A non-transitory computer-readable medium comprising computer-executable instructions that, when executed by a processor, cause the processor to at least:

receive input from a computing device through a data network, wherein the input comprises a request to perform an action;

determine to perform telephony-based message verification prior to performance of the action;

provide the computing device with verification instructions through the data network to send a message through a phone network to a specified destination, wherein the verification instructions include a deep link, wherein selection of the deep link generates a draft of the message, and wherein the draft of the message is addressed to the specified destination; and on receipt of the message through the phone network, cause performance of the action.

16. The non-transitory computer-readable medium of claim 15, wherein the deep link is embedded in a bar code, and wherein the bar code includes at least one of a QR code or a data matrix code.

17. The non-transitory computer-readable medium of claim 15, wherein the action is at least one of account creation, an update to user profile information, addition of a phone number for two factor authentication, generation of a one-time passcode, or a product order.

18. The non-transitory computer-readable medium of claim 15, wherein the computing device is further associated with a network address, and wherein the determination to perform telephony-based verification is based on at least one of a risk level for the network address, a risk level for a phone number corresponding to the request, or a risk threshold for behavior of a user corresponding to the request.

19. The non-transitory computer-readable medium of claim 15, wherein the instructions, when executed by the processor further cause the processor to:

determine that a specified timeout period has been exceeded for receipt of the message; and provide new verification instructions to the computing device through the data network, wherein the new verification instructions comprise a new destination.

20. The non-transitory computer-readable medium of claim 15, wherein the instructions, when executed by the processor further cause the processor to:

determine that the message has been dropped by the phone network; and provide new verification instructions to the computing device through the data network, wherein the new verification instructions comprise a new destination.

* * * * *